US011184113B2

(12) United States Patent
Rau et al.

(10) Patent No.: US 11,184,113 B2
(45) Date of Patent: Nov. 23, 2021

(54) PACKET REPLAY IN RESPONSE TO CHECKSUM ERROR

(71) Applicant: International Business Machines Corporation, Armonk, NY (US)

(72) Inventors: Benjamin Thomas Rau, Raleigh, NC (US); Christopher Meyer, Cary, NC (US); Kaleb Joshua Holley, Winton, NC (US); Richard Roberts, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/422,950

(22) Filed: May 24, 2019

(65) Prior Publication Data

US 2020/0374039 A1 Nov. 26, 2020

(51) Int. Cl.
*H04L 1/00* (2006.01)
*H04L 1/18* (2006.01)
*H04L 5/00* (2006.01)

(52) U.S. Cl.
CPC .......... *H04L 1/0083* (2013.01); *H04L 1/0061* (2013.01); *H04L 1/189* (2013.01); *H04L 1/1819* (2013.01)

(58) Field of Classification Search
None
See application file for complete search history.

(56) References Cited

U.S. PATENT DOCUMENTS

| 4,967,344 | A | * | 10/1990 | Scavezze | G06F 11/2007 714/4.5 |
| 5,809,334 | A | * | 9/1998 | Galdun | G06F 13/28 710/22 |
| 5,826,032 | A | | 10/1998 | Finn et al. | |
| 6,807,667 | B1 | * | 10/2004 | Bar | H04L 67/322 719/320 |
| 8,856,600 | B2 | | 10/2014 | Zadigian et al. | |
| 2001/0030964 | A1 | * | 10/2001 | Marietta | H04L 47/26 370/394 |
| 2002/0075966 | A1 | * | 6/2002 | Mikkola | H04L 1/0054 375/262 |
| 2003/0046580 | A1 | * | 3/2003 | Taniguchi | H04L 67/303 726/1 |
| 2004/0034826 | A1 | * | 2/2004 | Johansson | G06F 11/1044 714/752 |
| 2007/0116001 | A1 | * | 5/2007 | Kobayashi | H04L 69/161 370/392 |

(Continued)

OTHER PUBLICATIONS

Han et al., Efficient Packet Error Rate Estimation in Wireless Networks, IEEE, Conference Paper, pp. 1-9 (Year: 2007).*

(Continued)

*Primary Examiner* — April Y Blair
*Assistant Examiner* — Dipakkumar B Gandhi

(57) ABSTRACT

An example operation may include one or more of receiving a data packet from a network controller, where the data packet is marked as valid based on a checksum calculated by the network controller, determining that the checksum generated by the network controller is in error based on a recalculation of the checksum of the data packet via a network layer, and transmitting the data packet from the network layer to the network controller with a notification that the checksum is in error.

20 Claims, 7 Drawing Sheets

(56) References Cited

U.S. PATENT DOCUMENTS

| | | | | |
|---|---|---|---|---|
| 2008/0177855 A1* | 7/2008 | Arita | ............... | H04L 49/90 |
| | | | | 709/208 |
| 2009/0113081 A1* | 4/2009 | Wai | ............... | H04W 4/12 |
| | | | | 710/15 |
| 2009/0129309 A1* | 5/2009 | Thubert | ............... | H04L 69/324 |
| | | | | 370/315 |
| 2010/0071055 A1* | 3/2010 | Kaniz | ............... | H04L 63/164 |
| | | | | 726/14 |
| 2010/0262887 A1* | 10/2010 | Wilson | ............... | H04L 1/0071 |
| | | | | 714/758 |
| 2010/0309908 A1 | 12/2010 | Dolkas et al. | | |
| 2011/0289181 A1* | 11/2011 | Sankaran | ............... | H04L 41/046 |
| | | | | 709/213 |
| 2016/0329987 A1* | 11/2016 | Pang | ............... | H04L 65/4069 |
| 2017/0149626 A1* | 5/2017 | Yoon | ............... | H04L 41/5067 |
| 2018/0091332 A1* | 3/2018 | Rothermel | ............... | H04L 1/1829 |

OTHER PUBLICATIONS

Maxino et al., The effectiveness of Checksums for Embedded Control Networks, IEEE, vol. 6, Issue: 1, Journal Article, pp. 59-72. (Year: 2009).*

Han, et al., "Maranello: Practical Partial Packet Recovery for 802.11," NSDI, 2010, 14 pages.

Kreibich, "Design and Implementation of Netdude, a Framework for Packet Trace Manipulation," USENIX '04, 2004.

* cited by examiner

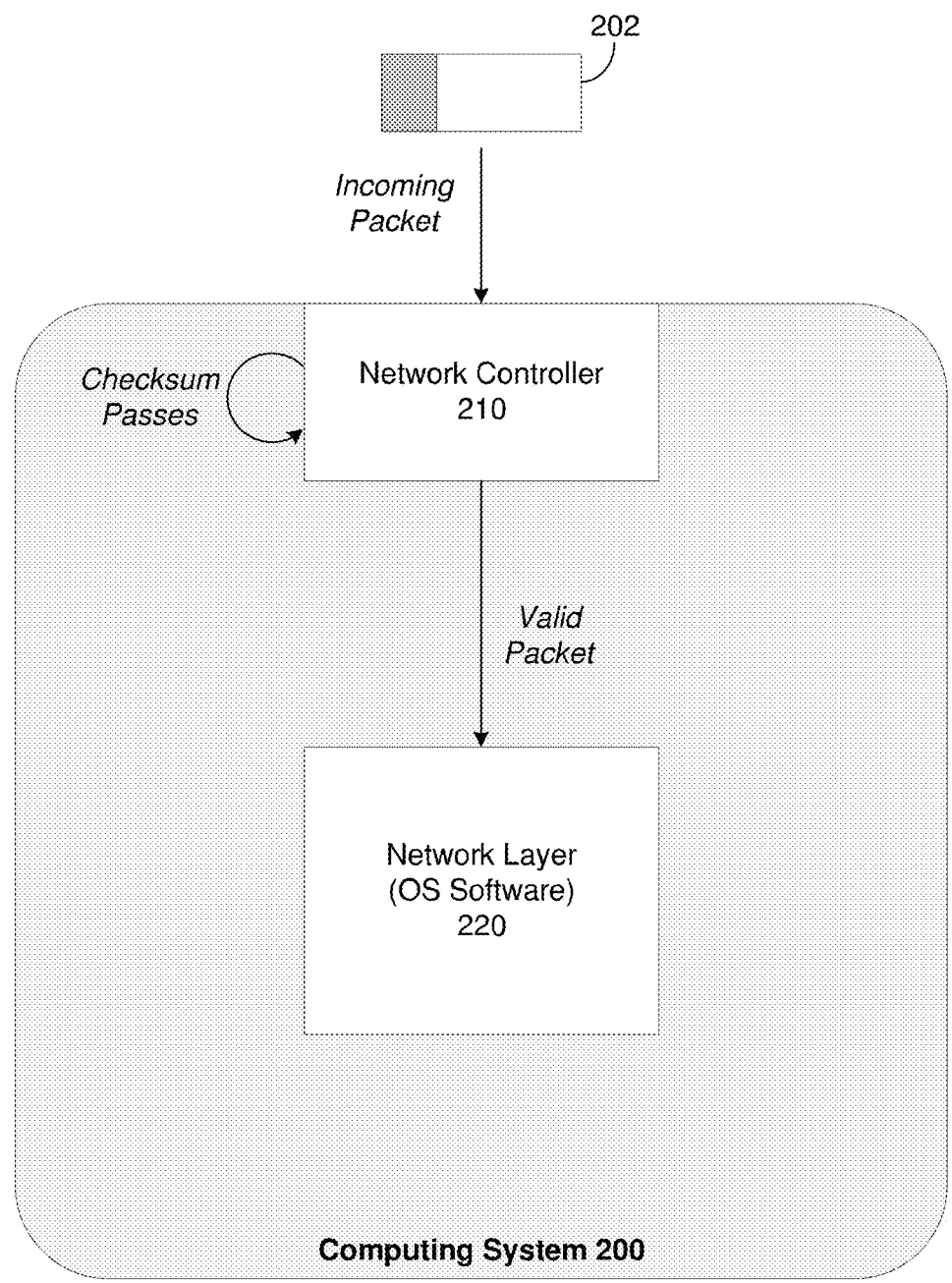

200B

200C

300A

300B

PACKET REPLAY IN RESPONSE TO CHECKSUM ERROR

TECHNICAL FIELD

This application generally relates to capturing diagnostics of a corrupted packet, and more particularly, to performing a replay of a packet in response to a checksum error.

BACKGROUND

Checksums are used to ensure the integrity of data portions for data transmission or storage. A checksum corresponds to a calculated summary of such data portion. Network data transmissions often produce errors, such as toggled, missing or duplicated bits. As a result, the data received might not be identical to the data transmitted, which can create serious errors (e.g., updating a bank account when one of the digits has changed, etc.) Because of these transmission errors, network protocols often use checksums to detect such errors. Here, a transmitter may calculate a checksum of the data and transmit the data together with the checksum. The receiver may calculate the checksum of the received data with the same algorithm as the transmitter. If the received and calculated checksums don't match a transmission error has occurred.

Some checksum algorithms are able to recover (simple) errors by calculating where the expected error must be and repairing it. If there are errors that cannot be recovered, the receiving side throws away the packet. Depending on the network protocol, this data loss is simply ignored or the sending side needs to detect this loss somehow and retransmits the required packet(s). Using a checksum drastically reduces the number of undetected transmission errors.

Recent trend has been to offload a checksum calculation and verification from an operating system code (e.g., a software stack, etc.) to a network controller (e.g., hardware). In this situation, a packet is received and a checksum is verified by network controller processing. When the checksum passes, the packet is forwarded to the stack marked as valid (or invalid if it does not pass). However, a problem in code can cause a packet to be detected as valid by the network controller and forwarded to the software stack even though a normal checksum calculation would detect the packet as failed/invalid. This is a considerable problem because the software stack treats the corrupted data as valid. Accordingly, what is needed is an improved mechanism for detecting corrupted data packets and performing diagnostics on the corrupted data packets.

SUMMARY

One example embodiment may provide a system that includes a processor configured to perform one or more of receive a data packet marked as valid from a network controller, determine that a checksum generated by the network controller is in error based on a recalculation of the checksum via a network layer, and transmit the data packet back to the network controller with a notification that the checksum is in error.

Another example embodiment may provide a method that includes one or more of receiving a data packet from a network controller, where the data packet is marked as valid based on a checksum calculated by the network controller, determining that the checksum generated by the network controller is in error based on a recalculation of the checksum of the data packet via a network layer, and transmitting the data packet from the network layer to the network controller with a notification that the checksum is in error.

A further example embodiment may provide a non-transitory computer readable medium comprising instructions, that when read by a processor, cause the processor to perform one or more of receiving a data packet from a network controller, where the data packet is marked as valid based on a checksum calculated by the network controller, determining that the checksum generated by the network controller is in error based on a recalculation of the checksum of the data packet via a network layer, and transmitting the data packet from the network layer to the network controller with a notification that the checksum is in error.

BRIEF DESCRIPTION OF THE DRAWINGS

FIGS. 2A-2C are diagrams illustrating processes of replaying a packet when a checksum is calculated in error according to example embodiments.

DETAILED DESCRIPTION

Figure 1:
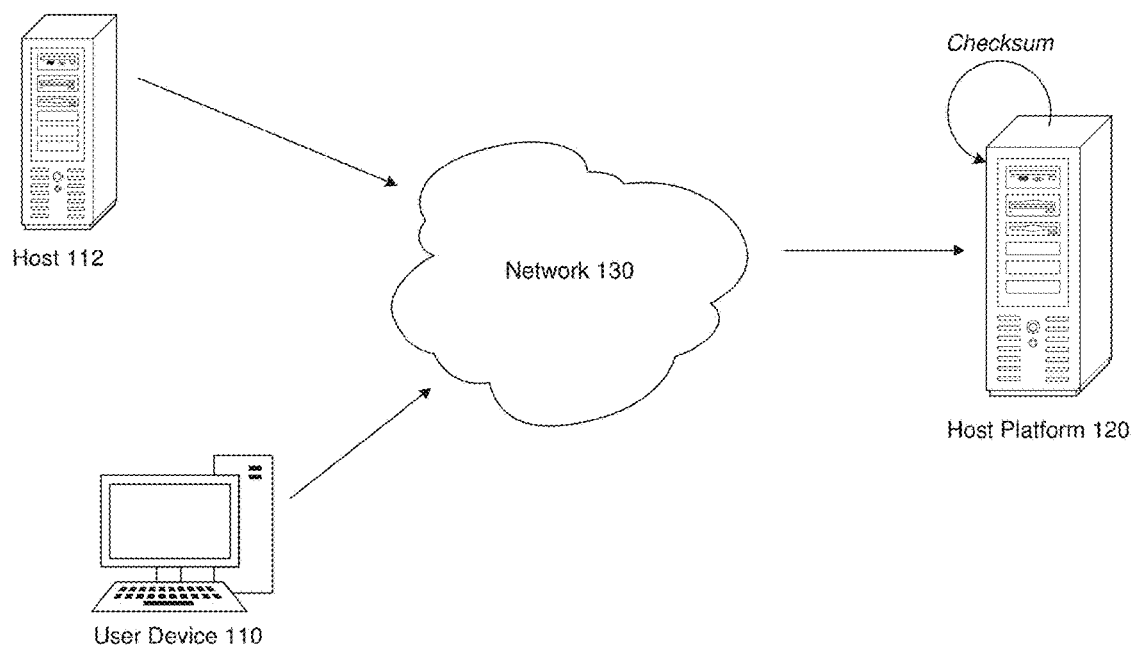
FIG. 1 is a diagram illustrating a network environment including a host platform according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

An inbound packet, for example, an Internet Protocol (IP) packet, a transmission control protocol (TCP) packet, a user datagram protocol (UDP) packet, and any other layer 3 protocol checksum, and the like, may be corrupted during transmission. The corruption may be caused by overlays during copying the packet in code. This can occur anywhere in a packet (including the checksum field). As another example, a single bit of packet data can be corrupted (flipped), for example if there is electrical interference on a wire. The corruption in the packet can be detected through a checksum calculation. When the corruption is detected, the host may be notified that checksum is bad and the packet may be discarded.

To ensure the integrity of the packet, a checksum can be calculated as a packet is generated (with the checksum field set to 00, etc.) When the checksum is calculated, it is then placed in the checksum field. If any part of the packet covered by the checksum is changed along the way (e.g., source to target, sender to receiver, etc.), when the checksum is calculated again it will be different, and the packet will be detected as being corrupted somewhere along the path of transmission.

Recently, systems have been offloading networking functions from the software networking layers (more expensive, general processing) to the hardware interfaces (less expensive). While the software networking layers are able to calculate checksums, the trend for performance reasons is to offload as much processing that can be done by the hardware layers as practical. As a result, often a network controller (also referred to herein as a network card, a network interface, and the like) is responsible for performing a checksum on an inbound packet. However, this can lead to a packet being incorrectly labeled as valid by the network controller when the packet is actually corrupted. Causes of such errors can be the result of code errors, checksum limitations, and the like, of the network controller. Mislabeling a packet as valid can cause negative consequences for the receiving application. Therefore, detecting these occurrences where the packet is incorrectly marked as valid because of an erroneous checksum is a top priority.

The example embodiments are directed to a system which can automatically replay a packet after detecting that a packet (e.g., a checksum, etc.) has been incorrectly marked as valid by a network controller. According to various embodiments, a network layer such as operating system code, an application, a host IP stack, and the like, can re-calculate the checksum which is initially calculated by the network controller to ensure that it agrees with the checksum calculation performed by the network controller. When the network layer detects in error in the checksum calculation by the network controller, the network layer may mark the packet as bad and send the packet back to the network controller to be replayed. Upon receipt, the network controller may set one or more traces and replay/reconstruct the packet through the same path. The traces can be used to capture diagnostic information of the error calculation.

According to various embodiments, the replay at the network controller (also referred to herein as network controller, network interface, etc.) may be automatically triggered by the network layer at nearly the same time as the initial error calculation occurred at the network controller. Therefore, it is likely that the network issues, network controller issues, code issues, and the like, which existed during the initial checksum calculation (and which caused the error) are still present and may occur again. In this scenario, when the replay is performed by the network controller and the same issue occurs, the trace can capture diagnostic information of the checksum miscalculation at the network controller.

Checksum problems which are difficult to debug are typically sporadic, and can take a long time to reproduce. Furthermore, running larger traces can be expensive (performance-wise). When recreating a checksum problem, there is typically no first failure data capture. The example embodiments however allow for quickly reproducing the checksum problem while capturing useful diagnostic information. Since the reproduction is happening quickly and automatically, the conditions that might have caused the problem are also much more likely to still be present. As an example, different code paths may exist while a network controller is under heavy streaming load. As another example, a different code path being taken due to hardware resources being constrained may still exist. Meanwhile, if the recreation process is forced to wait until a user can manually set traces and be ready for a data capture, the original conditions relevant to the problem are likely to have changed.

FIG. 1 illustrates a network environment 100 including a host platform 120 according to example embodiments. As a non-limiting example, the host platform 120 may be a host of services, applications, programs, and the like. The host platform 120 may include a web server, a cloud platform, a database, a user device, and the like. In some examples, a user device 110 and a host device 112 may access the host platform 120 via a network 130. Here, the network 130 may be the Internet, an intranet, a private network, and the like. Data may be transmitted from the user device 110 and/or the host device 112 to the host platform 120 via the network 130, and vice versa. The data may be in the form of packets. In this example, the host platform 120 may include a network controller configured to perform checksums on packets received from the user device 110 and the host device 112 via the network 130. However, it should be appreciated that the example embodiments are not limited to being performed by a host platform but may be implemented by any device with a network controller.

The host device 112 may be another host such as a server, a cloud, a database, and the like. The user device 110 may be a computer, a tablet, a mobile phone, an appliance, a television, a kiosk, and the like. Packets that are transmitted between the user device 110 and the host platform 120 or the host device 112 and the host platform 120 may be generated from network communications/traffic, for example, an email, a text message (SMS, MMS, etc.), a hypertext transfer protocol (HTTP) request, HTTP response, and the like.

Figure 2B:
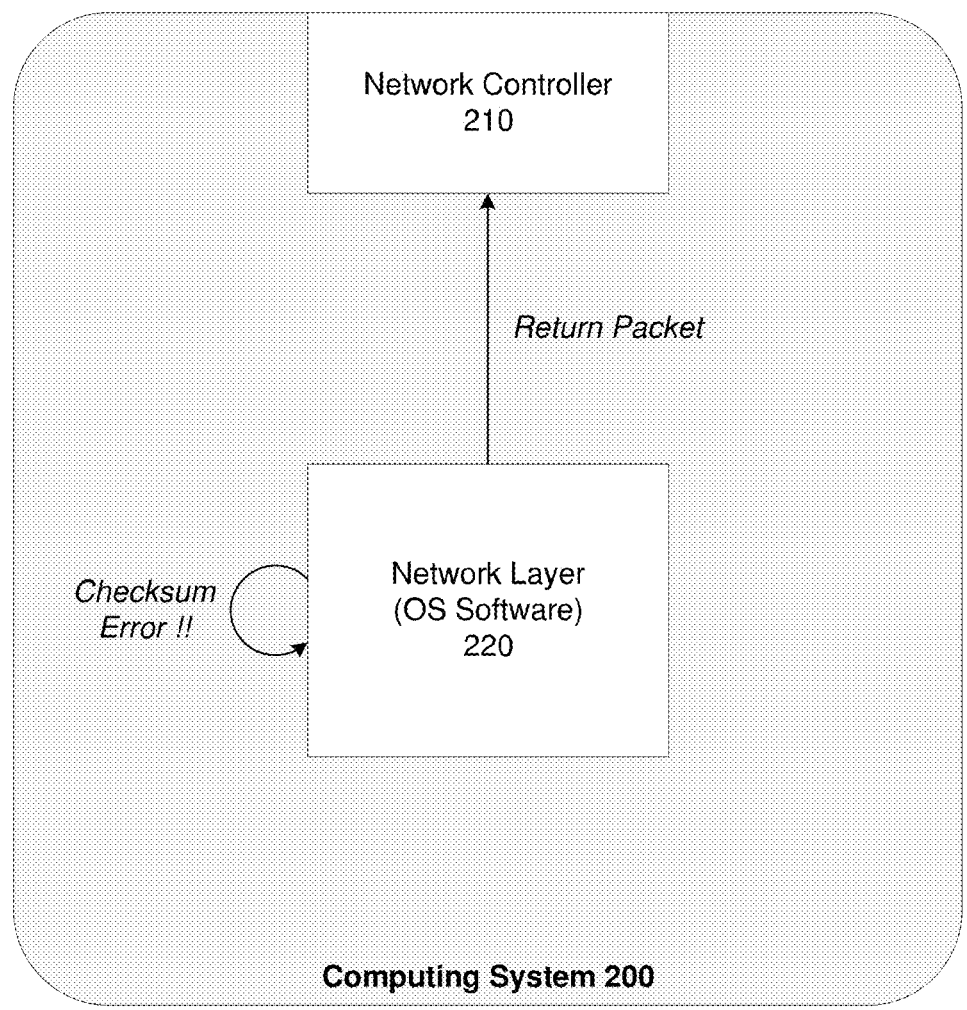
Figure 2C:
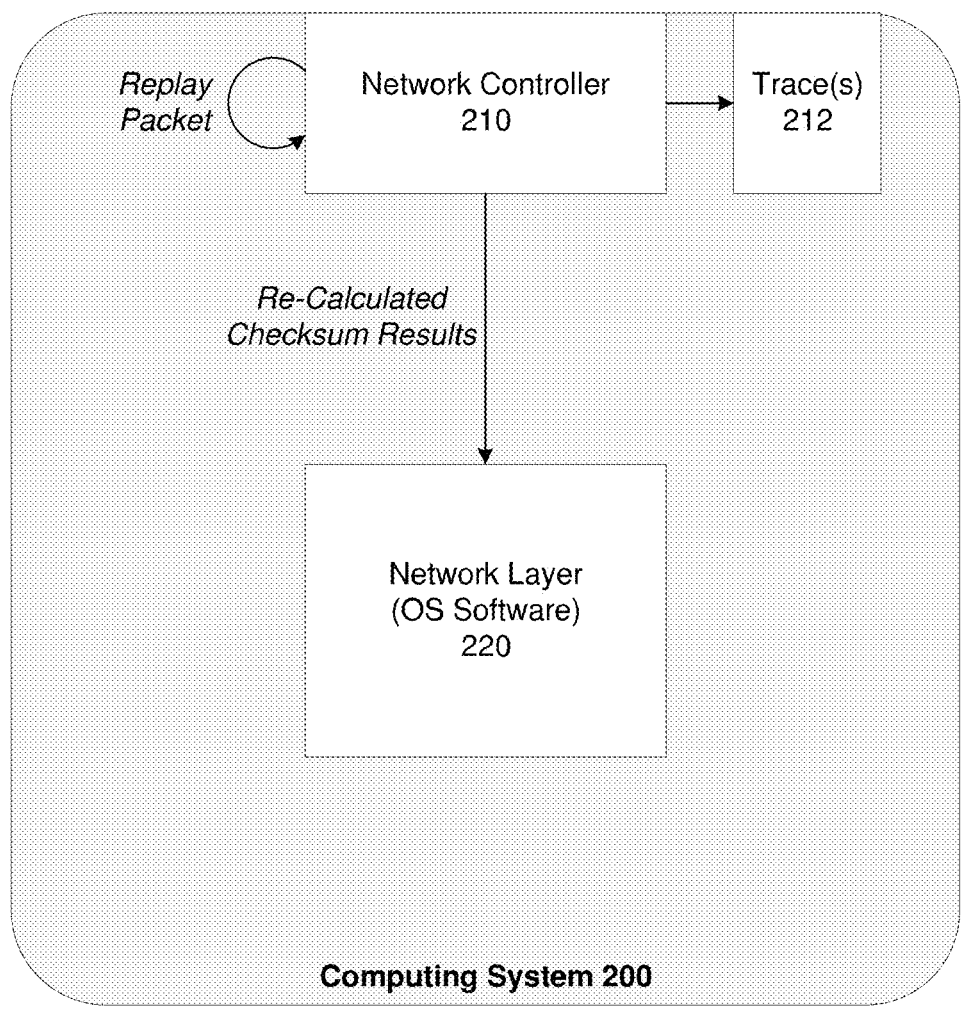

FIGS. 2A-2C illustrate processes 200A-200C for triggering a replay of a packet when the network layer determines a checksum is calculated in error, according to example embodiments. Referring to FIGS. 2A-2C, a computing system 200 includes a network controller 210 and a network layer 220. In this example, the computing system 200 may be a server, a cloud platform, a virtual machine, a logical partition (LPAR) such as used for a mainframe computer, a user device, and the like. The computing system 200 may be any device with a network controller or other hardware layer, and is not limited to the examples listed herein.

The network controller 210 may be an electronic device (e.g., computer hardware) that connects the computing system 200 to a computer network such as a local area network (LAN), a wide area network (WAN), private network, and the like. In some embodiments, the network controller 210 may be an internal network controller embedded in the motherboard of the computing system 200 rather than provided as an external component, however, embodiments are not limited thereto. The network controller 210 allows the computing system 200 to exchange data with the network. To achieve the connection, the network controller 210 may use a suitable protocol, for example, carrier sense multiple access with collision detection (CSMA/CD), and the like.

The network controller 210 may also be referred to as a network interface, a network card, a network interface controller, a network adapter and the like. The network controller 210 may implement the first two layers of the Open Systems Interconnection (OSI) model which includes the physical layer (layer 1) and the data link layer (layer 2). In some embodiments, the network controller 210 may be an open systems adaptor (OSA), but is not limited thereto.

The network layer 220 may represent operating system code, an application, a software stack, and the like. As a non-limiting example, the network layer 220 may be a network stack (software) that corresponds to the network layer (layer 3) and the transport layer (layer 4) of the OSI model and/or the Internet layer in the TCP/IP model. The network layer 220 may provide an ability to transfer variable-length network packets from a source to a destination via one or more networks.

Referring to FIG. 2A, in the process 200A, a checksum may be performed by the network controller 210 on an incoming packet 202. The checksum may be used to verify the integrity of the incoming packet 202. For example, the packet 202 may include a checksum that has been computed by a source (not shown) and that is stored in a portion of the incoming packet (e.g., header, etc.). The network controller 210 may calculate a checksum on the data portion of the packet 202 and determine whether the calculated checksum matches the checksum previously stored by the source. Here, the checksum may be calculated using a checksum function which can include an algorithm such as a cryptographic hash, etc. The checksum is the outcome of running the cryptographic hash function on a piece of data included in the packet 202. The network controller 210 may compare the calculated checksum with the one provided by the source to ensure that the received packet 202 is genuine and error free. When a checksum is validated, the packet 202 may be forwarded from the network controller 210 to the network layer 220 for further processing.

However, in some cases, the packet 202 that is found to be valid by the network controller 210 during the process 200A, may actually be corrupted. As a non-limiting example, code errors in the hardware layer may cause the network controller 210 to mistakenly identify the packet as valid, miscalculate the checksum, and the like. As another non-limiting example, limitations on checksum calculations at the network controller 210 may cause errors. The more sophisticated the network controller 210 with offloading functions, the more error paths that can be introduced where overlays and wrong data copies can occur. For example, an overlay in the hardware layer of the network controller 210 after the checksum has been performed can easily cause the error. In addition, a code error in how it presents data to the network error may cause the wrong data to be presented, even if only briefly. As another example, if a packet is passed up to the network layer 220, whether or not it is good (for accounting purposes), the manner of notification that the packet is good or not could have a bug or other problem.

Referring to FIG. 2B, during the process 200B, the valid packet is transferred from the network controller 210 to the network layer 220. Here, the network layer 220 may detect that the packet is invalid by performing a recalculation of the checksum. As such, the network layer 220 may recalculate the checksum and detect that the checksum calculated by the network controller is wrong/bad. In this case, the error can be detected by having a network stack, operating system code, and the like, also calculate checksums on packets that have been marked as valid by the network controller 210. If their checksum calculations do not agree, network layer 220 may determine that the checksum performed by the network controller 210 is in error in some way. As mentioned above, the error may be caused by checksum calculation limitations, code errors, and the like, at the network controller 210 resulting the packet being forwarded as valid even though a normal/proper checksum calculation would have marked the packet as failed/invalid. In this case, the corrupted packet may be marked as bad and returned back to the network controller 210 to replay the packet at the network controller 210 for diagnostic purposes.

Referring to FIG. 2B, when the network layer 220 returns the packet, the network layer 220 may add (or insert) a notification to replay the packet and to activate one or more traces. The network layer 220 may save the packet in question and mark the packet with in error indication so that the network controller 210 knows this packet is to be removed from the outbound packet stream. The marking may be accomplished in any number of ways (or a combination of them), including, but not limited to encapsulating the packet, setting a protocol option bit, creating a special outbound queue for error cases in code, and the like.

Referring to FIG. 2C, during the process 200C, the network controller 210 receives the packet returned from the network layer 220 and knows it has been marked as in error. In response, the network controller 210 may remove the packet from the outbound stream and may turn on one (automatically, in one embodiment) or more traces 212, and replay the packet through all layers inbound as it initially did. The traces may collect information of the calculation by the network controller 210 and store it in a storage such as a file, a log, and the like. Through the replay process, the network controller 210 may reconstruct the packet through the same layers that were constructed during the initial packet generation process. The data that is captured by the traces 212 can be used to run diagnostics on the redone checksum calculation by the network controller 210. The traces 212 can be performed (almost immediately, in one embodiment) after the initial checksum is determined to be miscalculated and thus the network conditions at the time at which the error occurred should be almost identical.

While it is possible for packets to be built and replayed through a network, traditionally, this process, when done for data capture is a manual process which requires a user to locate the packet in question via problem documentation outside the network interface. The user must also identify the correct network interface that this occurred on as well as to extract the packet, and have it replayed over the network. This manual process usually takes a prolonged period of time (e.g., hours, days, etc.) for the problem to be diagnosed by the user and reviewed by others, such as developers. As a result, by the time the packet is replayed, traffic conditions have likely changed drastically from when the problem was initially detected. For example, if a problem surfaced because of a code bug only seen under heavy traffic, by the time the packet was replayed, traffic on the system could be much lighter. In addition, traces frequently cannot be set automatically based on a certain inbound packet without creating special debug code loads for the network controller. Therefore, the choice is to either put together a debug code load, or try to catch the packet manually, which depending on the amount of traffic and the size of the trace buffer, can be very difficult to successfully capture good data.

The example embodiments provide a system which can automatically replay a packet very quickly after detecting there has been in error while capturing data of a miscalculation in near real-time. The system overcomes the drawbacks of manual packet capture by initiating a trace automatically when a network layer detects a checksum has been calculated in error. This process can happen at almost the same time that the error in calculation occurs. In doing so, the network conditions are likely to be the same or almost the same as when the error in calculation occurred thereby providing a great opportunity for tracing the error for diagnostic purposes.

As a non-limiting example, the checksums described herein may include IP checksums (Layer 3), TCP and UDP checksums (layer 4), and the like. Further, any checksum field in a packet could be checked by the example embodiments. As described in the example embodiments, a software stack (e.g., operating systems code, etc.) can double-check the checksum calculated by the network controller, and a replay/trace process may be automatically initiated if the checksum calculations do not match.

Referring again to FIG. 2C, during the process 200C the network controller 210 may reconstruct the packet as much as possible if not the entire identical packet. When the network controller 210 receives the returned packet, the network controller 210 may implement traces 212 (e.g., networking hardware traces, etc.) which can be set on a temporary basis. This can be beneficial because the traces 212 used to debug these types of problems are typically large in scope, and if run all the time would cause significant performance degradation. The traces 212 may be set back to default after the packet has been replayed and the results of the traces 212 may be automatically captured/saved. Furthermore, the packet may be inserted into the normal packet input stream as close to the source/wire as possible. The packet is then replayed through the networking hardware up to the network layer with traces 212 running. This process enables the network controller 210 to gather documentation based on the calculation of the checksum. According to various embodiments, the tracing that is triggered automatically can be terminated automatically as well, for example, based on a time limit a limit on the amount of data or packets that are traced.

Finally, the packet with the recalculated checksum can be forwarded to the network layer 220. In this example, the forwarded packet may include an indicator which indicates whether the checksum was found in error again during the recalculation. This enables the network layer 220 to know whether the documentation/data gathered by the traces 212 of the network controller 210 includes the erroneous checksum calculation.

Figure 3A:
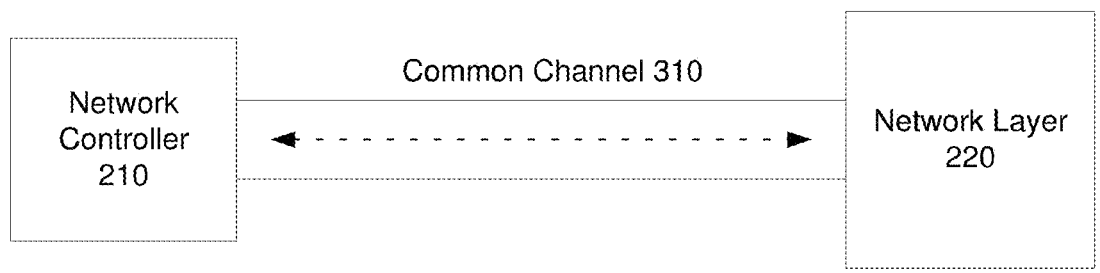
FIG. 3A is a diagram illustrating a common communication channel between a network controller and a network layer according to example embodiments.
Figure 3B:
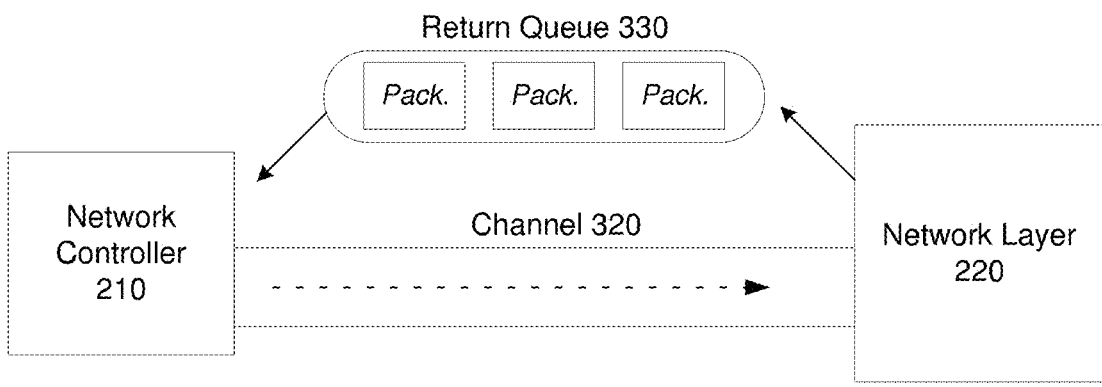
FIG. 3B is a diagram illustrating a queue designated for returning packets from a network layer to a network controller according to example embodiments.

FIG. 3A illustrates an architecture 300A which includes a common communication channel 310 between the network controller 210 and the network layer 220, according to example embodiments, and FIG. 3B illustrates an architecture 300B which includes a communication channel 320 between the network controller and the network layer, as well as a queue 330 designated for returning packets from the network layer 220 to the network controller 210, according to example embodiments. When in error in the checksum calculation by the network controller 210 is detected by the network layer 220, the packet may be sent back to the network controller 210 from the network layer 220.

In FIG. 3A, the packet can be sent back to the network controller through the same outbound channel (common channel 310) through which the packet was received by the network layer 220. Here, the returned packet may be encapsulated or otherwise marked as bad and required for replay. As another example, in FIG. 3B, the packet could be sent back from the network layer 220 to the network controller 210 through a special channel or path (i.e., queue 330). Here, the queue 330 may hold packets that need to be replayed for debugging purposes. In either scenario (FIG. 3A or FIG. 3B), the packet may be marked as bad by the network layer 220 and returned to the network controller 210 marked in error. In response, the network controller 210 can set traces specific to the error detected, and replay the packet again inbound alongside normal traffic (e.g., closely mimicking the error conditions) while capturing traces automatically. In some embodiments, the tracing that is triggered automatically can be terminated automatically as well, for example, based on a time limit or a limit on the amount of data or packets that are traced.

Figure 4:
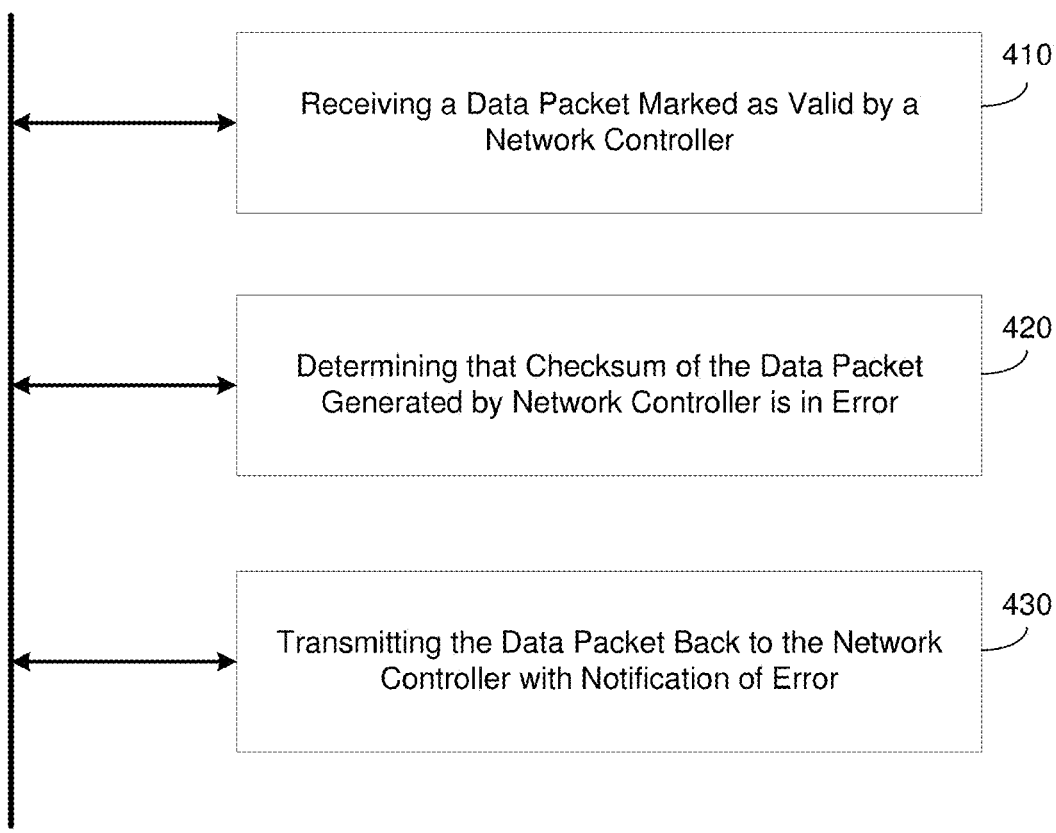
FIG. 4 is a diagram illustrating a method of replaying a data packet when a checksum is calculated in error according to example embodiments.

FIG. 4 illustrates a method 400 of replaying a data packet when a checksum is calculated in error according to example embodiments. Referring to FIG. 4, one or more of steps 410-430 may occur via one or more of the elements or nodes described or depicted herein. In step 410, the method may include receiving a data packet from a network controller, where the data packet is marked as valid. The data packet marked as valid can be based on a checksum calculated by the network controller. The network controller may include a network interface, a network card, a network interface controller, a network adapter and the like. The receiving may be performed by a network layer such as a network stack, an operating system code, an application, and the like. As described in the examples herein, the validly marked packet may be in error by the network controller. For example, the network controller may incorrectly calculate the checksum or otherwise label the checksum as being valid when transferring the packet to the network layer.

In step 420, the method may include determining that the checksum generated by the network controller is in error. This determination can be based on a recalculation of the checksum of the data packet via the network layer. The network layer may calculate a checksum of the data packet and compare it to the original checksum provided from the source and/or the checksum provided from the network controller. In response to detecting the checksum is different than the checksum provided from the source and/or the network controller, the network layer may determine that the checksum calculated or otherwise found to pass by the network controller is in error. The error may be caused by code, checksum limitations, etc.

In step 430, the method may include transmitting the data packet from the network layer to the network controller with a notification that the checksum is in error. By marking the packet as bad, the network controller knows to remove the packet from an outbound transmission channel. The notification may trigger one or more traces and a replay of the data packet, and the one or more traces are automatically captured based on the replay of the data packet. In some embodiments, the method may further include setting one or more traces and replaying the data packet via the network controller. In this example, the traces may be automatically captured when replaying the data packet. In some embodiments, the setting may include setting, by the network controller, one or more temporary hardware traces for debugging the error during the replaying of the data packet via the network controller. In some embodiments, the method further comprises automatically setting the one or more traces and replaying the data packet, via the network controller, in response to receiving the data packet marked as bad.

In some embodiments, the method may further include forwarding the replayed data packet from the network controller to the network layer with an indicator that indicates whether the checksum calculation by the network controller is determined to be valid during the replaying. In some embodiments, the checksum may include one or more of an Internet protocol (IP) checksum, a transmission control protocol (TCP) checksum, a user datagram protocol (UDP) checksum, and any other layer 3 protocol checksum. In some embodiments, the transmitting of the data packet from the network layer back to the network controller may be performed via a common channel or via an outbound queue designated for error code packets.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
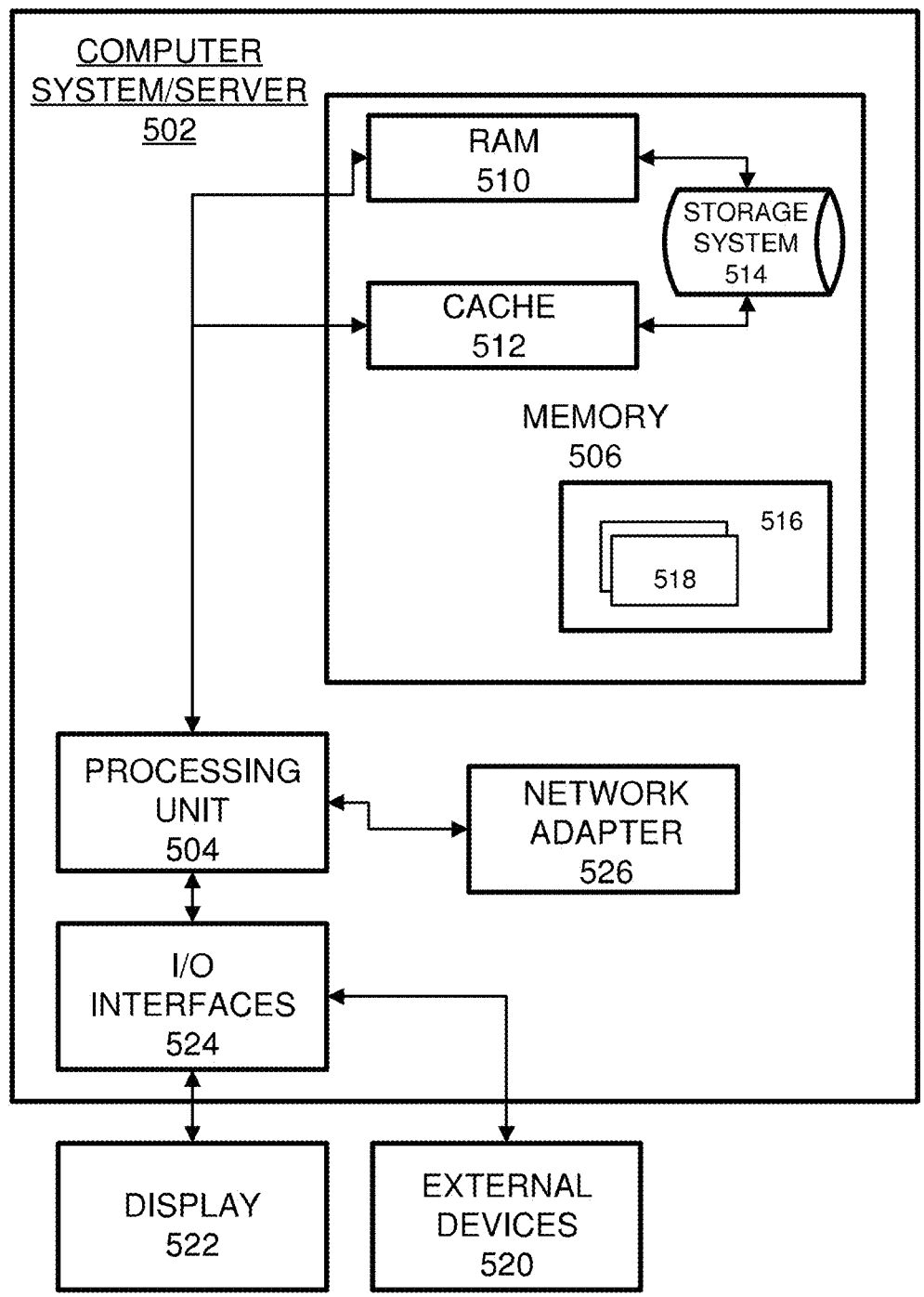
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth herein. For example, the computing node 500 may be a network server of a larger enterprise network that connects multiple user workstations to the Internet, a private network, and the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, and the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a processor configured to
      establish a channel between a network controller in a physical layer of the computing system and a software stack in a network layer of the computing system,
      receive, at the software stack in the network layer, a data packet marked by the network controller as having a checksum that has been validated by the network controller in the physical layer via the established channel, determine that the checksum generated by the network controller in the physical layer is in error based on a recalculation of the checksum via the software stack in the network layer, and transmit the data packet from the software stack in the network layer back to the network controller in the physical layer with a notification that the checksum is in error.

2. The computing system of claim 1, wherein the notification triggers one or more traces and a replay of the data packet in the physical layer, wherein the one or more traces are automatically captured based on the replay of the data packet.

3. The computing system of claim 2, wherein the one or more traces comprise one or more temporary traces to debug the error as the data packet is replayed.

4. The computing system of claim 1, wherein the processor is configured to receive a replayed data packet at the software stack in the network layer with an indicator that indicates whether recalculation of the checksum by the network controller in the physical layer is determined to be valid during the replay.

5. The computing system of claim 1, wherein the processor is configured to determine via the software stack in the network layer that the checksum generated by the network controller in the physical layer is in error when the recalculation of the checksum via the software stack is a different checksum value.

6. The computing system of claim 1, wherein the recalculation of the checksum comprises one or more of an Internet protocol (IP) checksum, a transmission control protocol (TCP) checksum, and a user datagram protocol (UDP) checksum.

7. The computing system of claim 1, wherein the software stack in the network layer is configured to mark the data packet as bad and send it back to the network controller in the physical layer.

8. The computing system of claim 1, wherein the processor is configured to transmit the data packet from the software stack in the network layer back to the network controller in the physical layer via the established channel through which the data packet was received from the network controller.

9. The computing system of claim 1, wherein the processor is configured to transmit the data packet from the software stack in the network layer back to the network controller in the physical layer via an outbound queue on the established channel which is designated for error code packets.

10. A method comprising:
   establishing a channel between a network controller in a physical layer of a computing system and a software stack in a network layer of the computing system;
   receiving, at the software stack in the network layer, a data packet from the network controller in the physical layer via the established channel, where the data packet is marked by the network controller as having a checksum that has been validated by the network controller in the physical layer;
   determining that the checksum generated by the network controller in the physical layer is in error based on a recalculation of the checksum of the data packet via the software stack in the network layer; and
   transmitting the data packet from the software stack in the network layer to the network controller in the physical layer with a notification that the checksum is in error.

11. The method of claim 10, wherein the notification triggers one or more traces and a replaying of the data packet via the network controller in the physical layer, and the one or more traces are automatically captured based on the replay of the data packet.

12. The method of claim 11, wherein the one or more traces comprise one or more temporary traces for debugging the error during the replaying of the data packet.

13. The method of claim 10, further comprising receiving a replayed data packet at the software stack in the network layer with an indicator that indicates whether recalculation of the checksum by the network controller in the physical layer is determined to be valid during the replaying.

14. The method of claim 10, wherein the determining comprises determining that the checksum of the data packet generated by the network controller in the physical layer is in error when the recalculation of the checksum via the software stack in the network layer is a different checksum value.

15. The method of claim 10, wherein the recalculation of the checksum comprises one or more of an Internet protocol (IP) checksum, a transmission control protocol (TCP) checksum, and a user datagram protocol (UDP) checksum.

16. The method of claim 10, wherein the transmitting comprises the software stack in the network layer marking the data packet as bad and sending it back to the network controller in the physical layer.

17. The method of claim 10, wherein the transmitting comprises transmitting the data packet from the software stack in the network layer back to the network controller in the physical layer via the established channel through which the data packet was received from the network controller in the physical layer.

18. The method of claim 10, wherein the transmitting comprises transmitting the data packet from the software stack in the network layer back to the network controller in the physical layer via an outbound queue on the established channel designated for error code packets.

19. A non-transitory computer readable medium comprising instructions, that when read by a processor, cause the processor to perform a method comprising:
   establishing a channel between a network controller in a physical layer of a computing system and a software stack in a network layer of the computing system;
   receiving, at the software stack in the network layer, a data packet from the network controller in the physical layer via the established channel, where the data packet is marked by the network controller as having a checksum that has been validated by the network controller in the physical layer;
   determining that the checksum generated by the network controller in the physical layer is in error based on a recalculation of the checksum of the data packet via the software stack in the network layer; and
   transmitting the data packet from the software stack in the network layer to the network controller in the physical layer with a notification that the checksum is in error.

20. The non-transitory computer readable medium of claim 19, wherein the notification triggers one or more traces and a replaying of the data packet via the network controller in the physical layer, and the one or more traces are automatically captured based on the replay of the data packet.

* * * * *